United States Patent
Kah

(10) Patent No.: US 12,507,641 B2
(45) Date of Patent: Dec. 30, 2025

(54) METHOD AND SYSTEM FOR CONTROLLING AN IRRIGATION SYSTEM

(71) Applicant: Trevor Kah, North Palm Beach, FL (US)

(72) Inventor: Trevor Kah, North Palm Beach, FL (US)

( * ) Notice: Subject to any disclaimer, the term of this patent is extended or adjusted under 35 U.S.C. 154(b) by 501 days.

(21) Appl. No.: 17/446,047

(22) Filed: Aug. 26, 2021

(65) Prior Publication Data

US 2022/0061237 A1   Mar. 3, 2022

Related U.S. Application Data

(60) Provisional application No. 63/070,590, filed on Aug. 26, 2020.

(51) Int. Cl.
*A01G 25/16*   (2006.01)
*G05B 19/042*   (2006.01)

(52) U.S. Cl.
CPC ............ *A01G 25/16* (2013.01); *G05B 19/042* (2013.01); *G05B 2219/2625* (2013.01)

(58) Field of Classification Search
CPC ............... A01G 25/16; G05B 19/042; G05B 2219/2625; G05B 19/0426; Y02A 40/22
See application file for complete search history.

(56) References Cited

U.S. PATENT DOCUMENTS

| | | | |
|---|---|---|---|
| 9,762,374 B1* | 9/2017 | Li | H04B 3/54 |
| 2003/0179102 A1* | 9/2003 | Barnes | G05B 19/042 |
| | | | 340/870.07 |
| 2012/0016497 A1* | 1/2012 | Marsters | G05B 19/0426 |
| | | | 700/23 |
| 2014/0129039 A1* | 5/2014 | Olive-Chahinian | A01G 25/16 |
| | | | 700/284 |
| 2016/0100533 A1* | 4/2016 | Bauman | G05B 15/02 |
| | | | 700/284 |
| 2018/0014480 A1* | 1/2018 | Montgomery | A01G 25/16 |
| 2019/0261584 A1* | 8/2019 | Olive-Chahinian | A01G 25/16 |
| 2021/0021966 A1* | 1/2021 | Griggs | H04W 52/0248 |
| 2022/0132757 A1* | 5/2022 | Woytowitz | G05F 1/445 |
| | | | 700/284 |

* cited by examiner

*Primary Examiner* — Ziaul Karim
(74) *Attorney, Agent, or Firm* — Amster, Rothstein & Ebenstein LLP

(57) ABSTRACT

Am irrigation control system includes a controller element connected to one or more decoders that control sprinklers in one or more irrigation zones and a mobile electronic device or module configured to scan and identify individual decoders and provide irrigation program information to the controller element that provides instructions for watering at each of the irrigation zones, where the instructions are encoded or otherwise specified for execution by desired decoders.

14 Claims, 9 Drawing Sheets

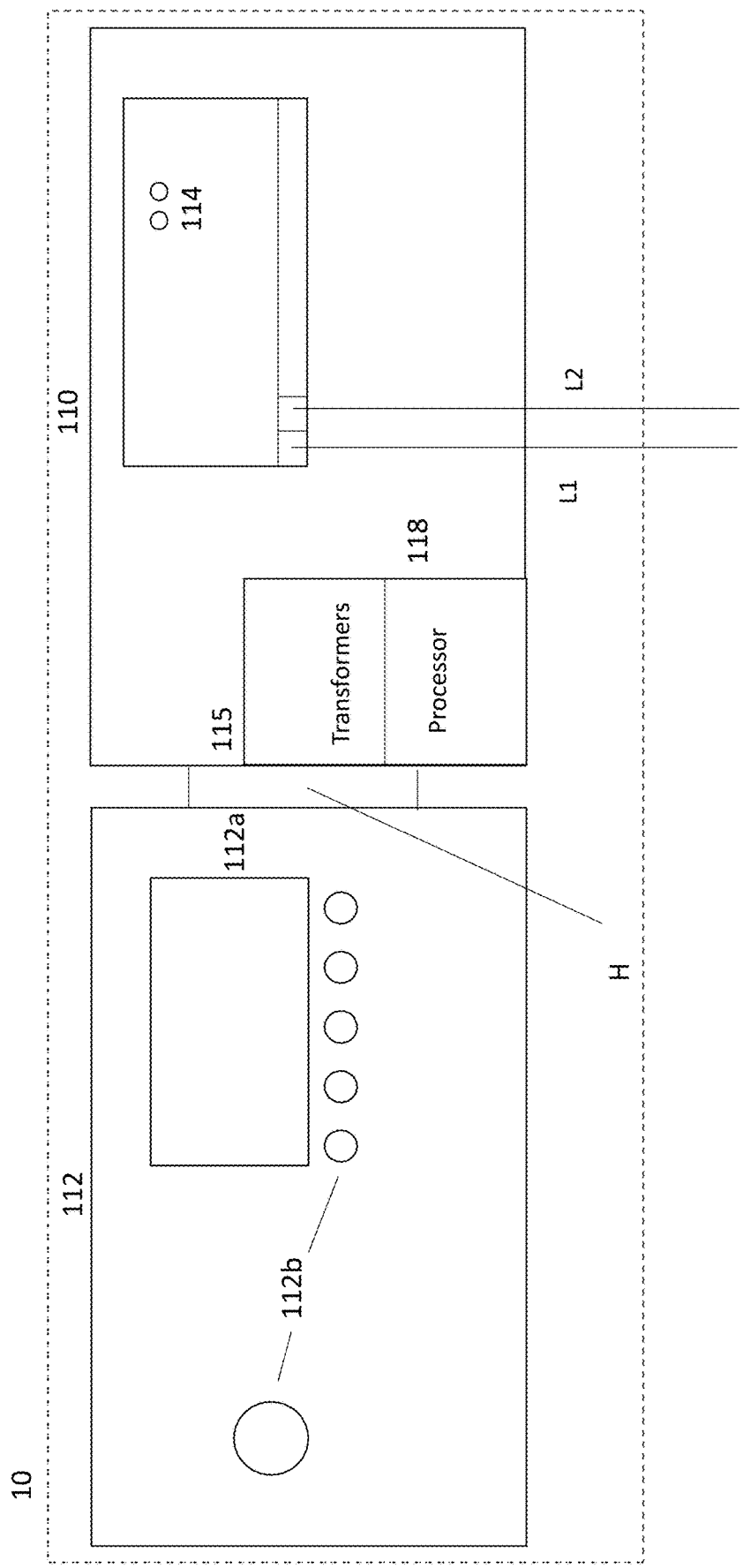

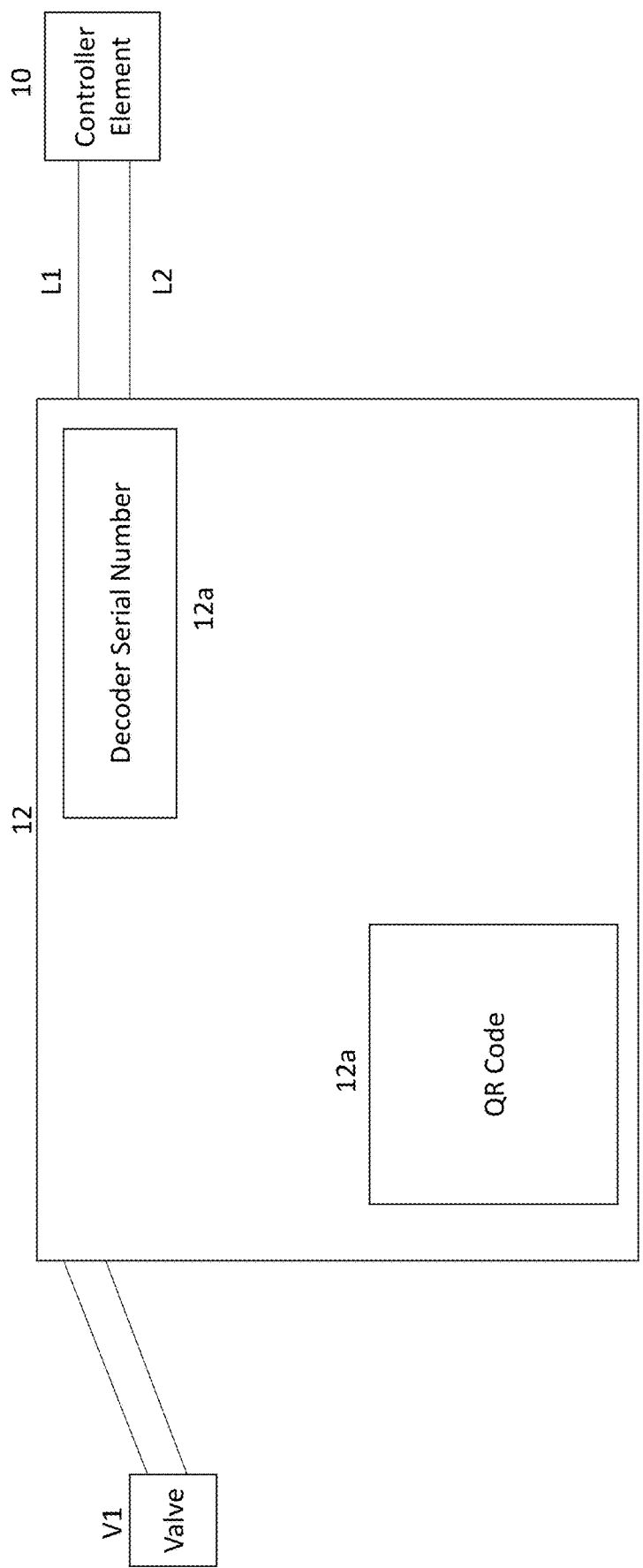

METHOD AND SYSTEM FOR CONTROLLING AN IRRIGATION SYSTEM

CROSS-REFERENCE TO RELATED APPLICATIONS

The present application claims benefit of and priority to U.S. Provisional Patent Application No. 63/070,590 filed Aug. 26, 2020 entitled METHOD AND SYSTEM FOR CONTROLLING AN IRRIGATION SYSTEM, the entire content of which is incorporated by reference herein.

BACKGROUND

Field

The present application relates to a method and system for controlling an irrigation system. In particular, the present application relates to a control system for an irrigation system that provides for identifying and tracking specific decoder elements in the irrigation system.

Description of the Art

Irrigation systems may include multiple irrigation zones which may be individually controlled by a controller element. Such irrigation systems may include one or more decoders provided on a control line connected to the controller element by which commands are transferred. In embodiments, the decoders are connected in series on the control line such that all of the decoders receive all commands provided on the control line. The commands are encrypted for transmission on the control line and decrypted at the decoders. Only commands intended for the respective decoder will be executed by that decoder. In such systems, each decoder may be registered with the controller element via connection. One technical problem inherent in conventional control systems is that the controller element must be manually programmed at the control device to associate each decoder with an irrigation zone which is time consuming and subject to error.

Accordingly, it would be beneficial to provide an irrigation control system that avoids these and other problems.

SUMMARY

An irrigation control system in accordance with an embodiment of the present disclosure includes a controller element, at least one control line connected thereto, at least one decoder element connected to the control line, wherein the at least one decoder element is associated with a unique identifier, and at least one sensor element configured and operable to identify the at least one decoder and to communicate with the controller element to provide location information and station information associated with the decoder to the controller element.

An irrigation control system in accordance with an embodiment of the present disclosure includes: a controller configured to provide control signals to an irrigation system based on irrigation program information; a decoder configured to control one or more valves of the irrigation system, the decoder including a unique identifier; a control line connecting the controller to the decoder and operable to provide the control signals to the decoder, wherein the control signals include identification information associated with the decoder; wherein the decoder operates the one or more valves based on the control signals when the identification information corresponds to the unique identifier associated with the decoder; a sensor configured to obtain unique identifier information based on the unique identifier, wherein the unique identifier information is provided to the controller and the controller provides the control signals based on the unique identifier information.

In embodiments, the irrigation control system includes a navigation element configured to provide location information associated with the decoder.

In embodiments, the location information is associated with the unique identifier information of the decoder.

In embodiments, the irrigation control system includes a mobile electronic device, wherein the sensor and navigation element are provided in the mobile electronic device.

In embodiments, the mobile electronic device provides the unique identifier information and associated location information to the controller.

In embodiments, the mobile electronic device generates a map indicating the decoder and the location information is provided based on interaction with the map.

In embodiments, the mobile electronic device includes a display and is configured to present the map on the display.

In embodiments the mobile electronic device includes one or more input elements and the location information is provided via the input elements.

In embodiments, the mobile electronic device includes a GPS device and the location information is provided by the GPS device.

In embodiments, the decoder is connected to at least a first valve and the decoder provides control signals to open and close at least the first valve.

In embodiments, the irrigation control system includes a second decoder configured to control at least a second valve, wherein the second valve is connected to the second decoder, wherein the second decoder includes a second unique identifier; the control line connecting the controller to the second decoder and operable to provide the control signals to the second decoder based on the second unique identifier information.

In embodiments, the navigation device is configured to obtain second location information associated with the second decoder.

In embodiments, the second unique identifier information is associated with the second location information.

In embodiments, the map indicates the second decoder and a respective position thereof in the irrigation system.

In embodiment, the second location information is provided via interaction with the map.

In embodiments, a method of controlling an irrigation system in accordance with an embodiment of the present application includes obtaining unique identifier information associated with a decoder based on a unique identifier associated with the decoder; associating the unique identifier information with at least one valve in the irrigation system; obtaining irrigation program information including at least one on time and off time for the at least one valve; and generating control signals for the decoder including identification information associated with the unique identifier information and sending the control signals to the decoder to control the at least one valve.

In embodiments, the method includes obtaining location information associated with the decoder, wherein the associating step includes associating the location information with the unique identifier information.

In embodiments, the step of obtaining irrigation program information may include receiving the irrigation program information from an electronic mobile device.

In embodiments, the location information may be provided from an electronic mobile device.

In embodiments, the unique identifier information may be provided from the electronic mobile device.

BRIEF DESCRIPTION OF THE DRAWINGS

FIG. 3A illustrates an exemplary controller element that may be used as the controller element in the system of FIG. 1;

FIG. 4 illustrates the decoder element of FIG. 2 highlighting the unique identification information;

DESCRIPTION OF THE EMBODIMENTS

Figure 1:
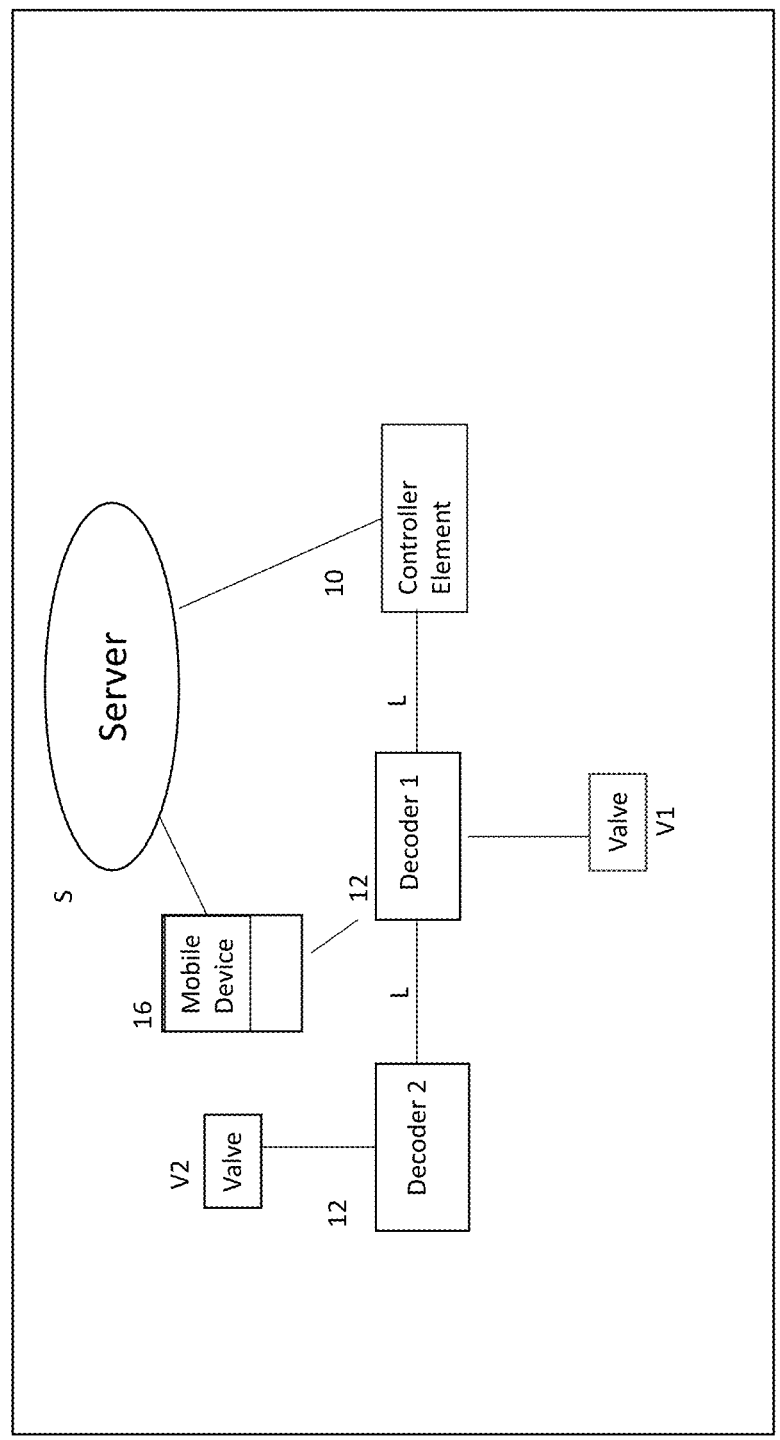
FIG. 1 shows an exemplary block diagram of an irrigation control system in accordance with an embodiment of the present invention.
Figure 2:
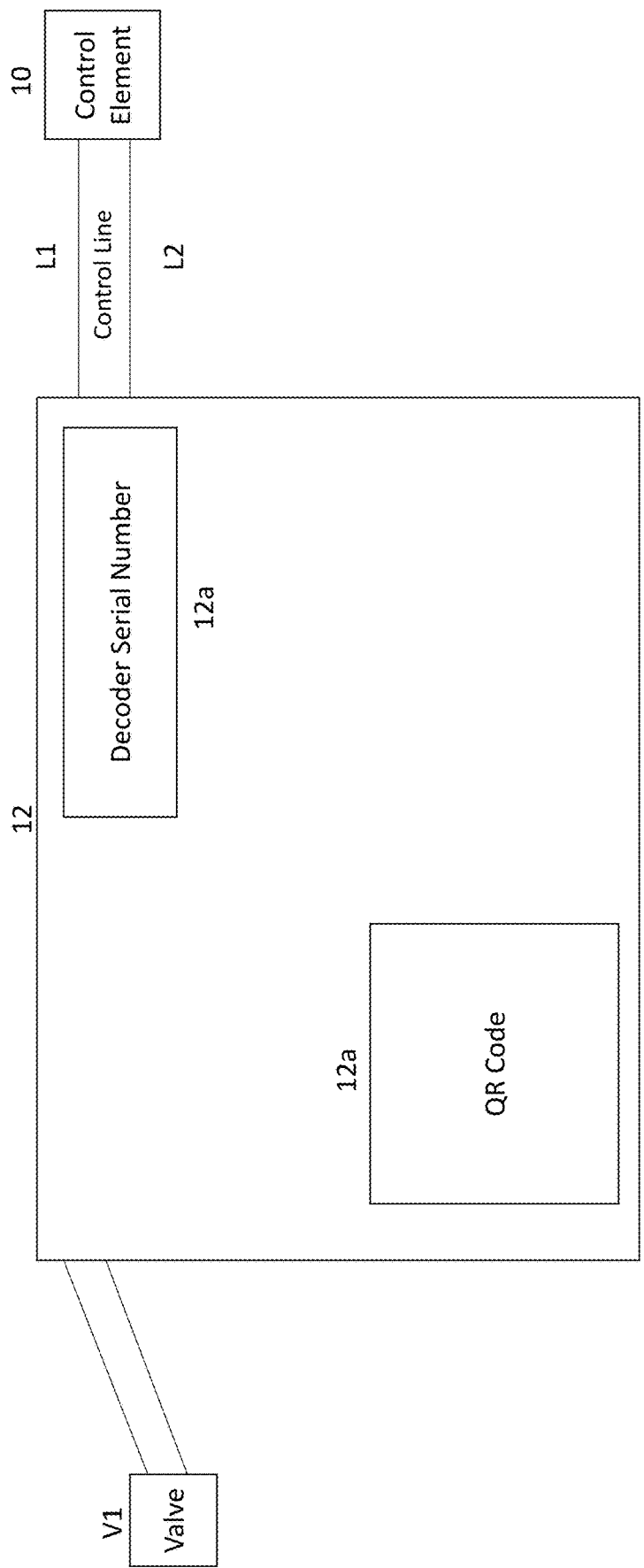
FIG. 2 shows a schematic view of the decoder element used in the irrigation control system of FIG. 1.

An irrigation control system 1 in accordance with an embodiment of the present invention is shown in FIG. 1. In embodiments, the controller element 10 provides control signals to control the irrigation system 1. In particular, the controller element 10 may provide control signals to the decoder(s) to activate the valves V1, V2 to open and close to activate one or more sprinklers. In embodiments, the one or more sprinklers may be grouped into an irrigation zone and each valve V1, V2 may control flow of water to one or more sprinkler, one or more irrigation zone and/or one or more sprinklers in an irrigation zone. In embodiments, the controller element 10 may provide the control signals on control line L that is connected to the controller element 10. In embodiments, the control line L may include a pair of wires L1, L2 (see FIG. 2, for example), one of which is hot (powered) and the other of which is a return line to the controller element 10. In embodiments, the hot wire preferably has a voltage (relative to the return) that is sufficiently high to drive opening and closing of the valves V1, V2 as well as the decoders 12. In embodiments, the voltage on the wires may be between 24-40 V. In embodiment, the voltage on the wires L1, L2 may be 38-40V.

Figure 3B:
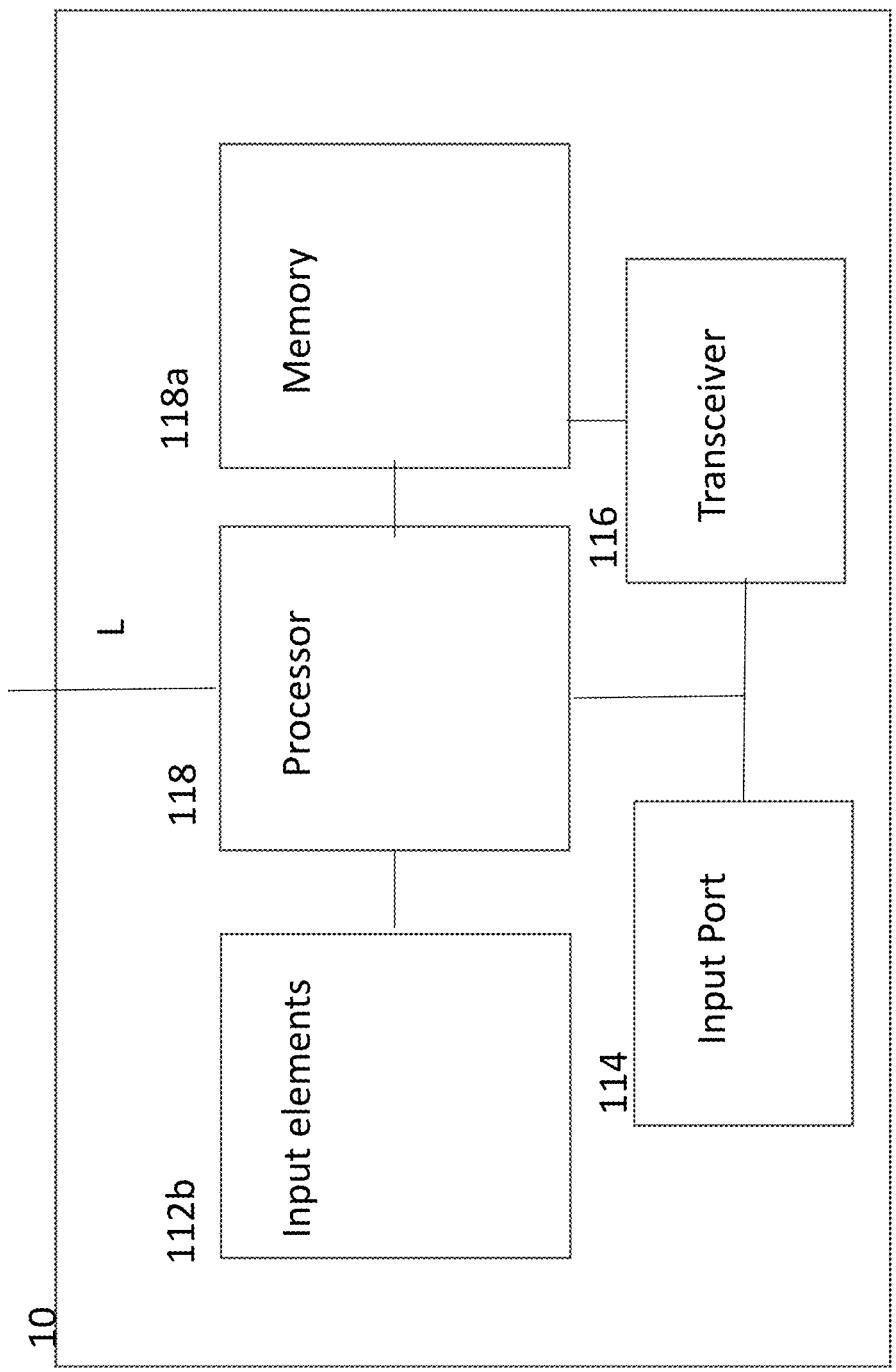
FIG. 3B is illustrates an exemplary block diagram of the controller element of FIG. 3A.

In embodiments, the controller element 10 may include a body 110 with a front panel 112 (see FIG. 3A, for example). In embodiments, the body 110 may be connected to the panel 112 via the hinge H such that the front panel 112 may be moved relative to the body 110 to allow access to the body. In embodiments, the front panel 112 may include a display 112a configured to display information to a user. In embodiments, the display 112a may be on an inner surface of the panel 112. In embodiments, the display 112a may be on the outer surface of the panel 112 such that it is accessible when the panel closes the body 110. In embodiments, the display 112a may be an LCD display, LED display or any other suitable video display element. In embodiments, the front panel 112 may include one or more input elements 112b, such as buttons, selectors, dials or a keypad that may be used to input information to the controller element 10. In embodiments, the controller element 10 may include an input port 114 configured to provide an electronic connection to the controller element 10 via a wired connection. In embodiments, the controller element 10 may include a transmitting and receiving element 116 (transceiver) (see FIG. 3B, for example) that may be used to provide for communication using wireless transmission. In embodiments, a wired connection provided via the port 114 and/or the wireless communication via the transceiver element 116 may be used to receive irrigation program information or other data associated with operation of the irrigation system. In embodiments, the port 114 may be positioned in a sidewall of the body 110 and may provide a connection to the processor 118. In embodiments, the port 114 may be provided in the body 110 and an opening may be formed in a sidewall of the body to allow entry of a wire. In embodiments, when the panel 112 is in a closed position, it contacts the sidewall of the body 110 to prevent access to the interior of the body 110.

In embodiments, the body 110 (or panel 112) may include one or more processors 118 operably connected to or included with one or more memory elements 118a (see FIG. 3B). In embodiments, the one or more processors 118 and/or the memory elements 118a may be mounted on the front panel 112. In embodiments, the one or more processors 118 and/or the memory elements 118a may be mounted in the body 110. In embodiments, the memory elements 118a may store irrigation program information associated with operation of the irrigation system in accordance with a desired watering program. In embodiments, the irrigation program information may be provided using the input elements 112b included on the panel 112. In embodiments, the irrigation program information may be provided via the port 114 or via the transceiver element 116. In embodiments, the irrigation program information may include on times, off times, watering day information, etc. In embodiments, the irrigation program information may be provided for each individual sprinkler in the irrigation system or may be provided for multiple sprinklers that are grouped together as an irrigation zone. In embodiments, the one or more memory elements 118a may include processor executable code that when executed by the processor 118 controls operation of the sprinklers in accordance with the irrigation program information. In embodiments, the processor 118 executes the processor executable code to generate control signals to be sent to the decoder(s) 12 to actuate the valves V1, V2, for example, as indicted by the irrigation program information to provide watering at the indicated on times for the indicated duration (between the on time and the off time) on the indicated watering days. In embodiments, the control signals may include identification information unique to respective decoders 12 for which the instructions are intended such that the valves V1, V2, for example, may be controlled separately.

In embodiments, the irrigation program information may include different instructions for watering in different irrigation zones or by different valves controller by different decoders 12. In embodiments, some irrigation zones may receive more frequent watering than others based on the plant life in the irrigation zone, for example. In embodiments, watering on times and off times may be varied to provide for additional or less watering based the plant life in the irrigation zone, geographical location, or shade conditions of the zone, to name a few. In embodiments, individual decoders 12 may be associated with a specific irrigation zone or a specific valve or valves. In embodiments, location information associated with each uniquely identified decoder 12 may be used to associate each decoder with an irrigation zone, or individual valve or valves.

In embodiments, the processor 118 may provide the control signals to turn valves (V1, V2) on and off in accordance with the irrigation program information such that each irrigation zone, or individual sprinkler, provides irrigation in accordance with the irrigation program. In embodiments, the control line L (which may include the wire pair L1, L2) may be used to provide the instructions to the decoders 12 which in turn control the valves V1, V2 to turn them one and off, for example to supply water to individual sprinklers or irrigation zones. In embodiments, each irrigation zone, or individual sprinkler, may include or be associated with a decoder 12 that is wired in series with the control line L. In embodiments, each decoder 12 may include a unique identifier 12a (see FIGS. 2 and 4, for example) that is associated uniquely with the respective decoder 12. In embodiments, the unique identifier 12a may be, or may include, a number or an alphanumeric string of characters unique to the decoder 12. In embodiments, the unique identifier 12a may be or may include a graphical representation, such as a QRcode, barcode or other graphical symbol or indicia that may be provided on an exterior of the decoder 12. In embodiments, the unique identifier 12a may be provided on or added to the exterior of the decoder 12. In embodiments, the unique identifier 12a may be included in or on the decoder 12 at the time of manufacture. In embodiments, the QR code, barcode or other indicia may be or may include or represent the number or alphanumeric string of characters discussed above or may otherwise include information unique to the decoder 12. In embodiments, the number or alphanumeric string of characters may be transmitted, wirelessly for example.

In embodiments, the unique identifier 12a may be, or may include an RFID tag. In embodiments, the unique identifier 12a may be or may be included in a passive or active RFID tag. In embodiments, the RFID tag may be integrated into the decoder 12. In embodiments, the RFID tag may be attached to the decoder 12. In embodiments, the unique identifier 12a may be a communication beacon configured to transmit wirelessly, such as a BLUE TOOTH beacon. In embodiments, the unique identifier 12a be or include information transmitted wirelessly using any suitable short range communication system or protocol. In embodiments, the unique identifier 12a may be associated with location information indicating a location of the decoder 12, which may be associated with the individual decoder. In embodiments, the unique identifier 12a may be uniquely associated with the respective decoder 12 in which it is integrated or to which it is attached as well as location information indicating a location of the decoder device. In embodiments, the unique identifier 12a may be non-visual. In embodiments, the unique identifier 12a may be variable or programmable such that a user maybe able to designate a unique identifier 12a and the identifier may be stored in or associated in a memory provided at the decoder. In embodiments, the unique identifier 12a may be generated and transmitted to the decoder and saved in a memory, for example in an RFID tag or beacon. In embodiments, a graphical representation may be generated and printed on the decoder 12. In embodiments, the graphical representation may be generated and then printed on another medium, such as a paper or plastic and then affixed to the decoder 12.

Figure 5:
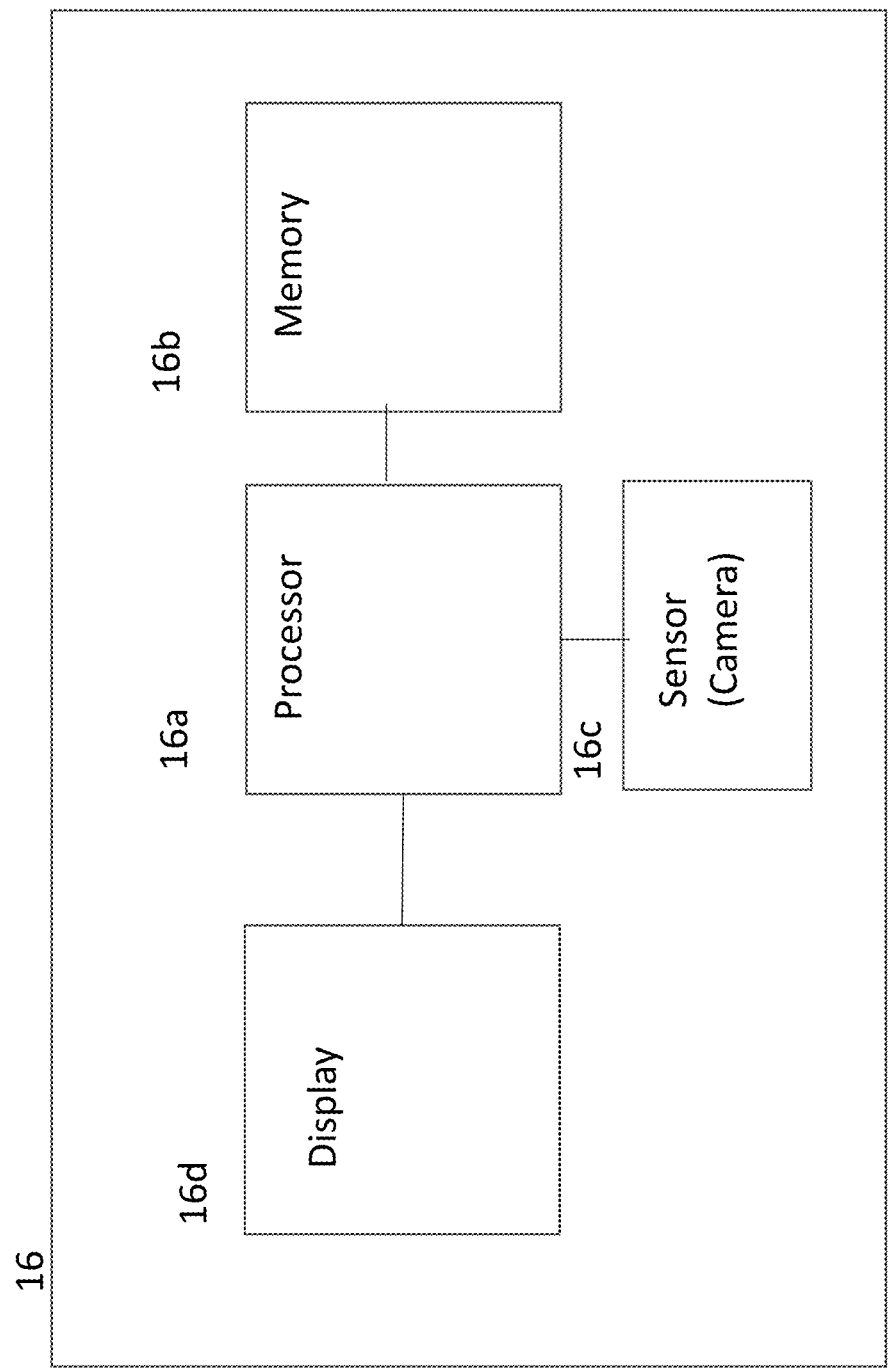
FIG. 5 illustrates an exemplary block diagram of a mobile electronic device suitable for use in the irrigation control system of FIG. 1.

In embodiments, the irrigation control system 1 may include or communicate with a mobile electronic device 16. In embodiments, the mobile electronic device 16 may be a smart phone, smart watch, a t\ablet, a laptop computer or another portable electronic device, to name a few, that provides wireless connectivity or other wired or wireless communication. In embodiments, connectivity may take place via the Internet. In embodiments, the mobile electronic device 16 may include one or more processors 16a (see FIG. 5, for example) and one or more memory elements 16b included in or operably connected to the one or more processors. In embodiments, the one or more memory elements 16b may include processor executable code, executable by the one or more processors 16a to provide irrigation program information to the controller element 10. In embodiments, the executable code may be provided in the form of a software application configured to facilitate communication with the controller element 10 and to provide the irrigation program information. In embodiments, the one or more memory elements 16b may store the irrigation program information which may be obtained from the controller element 10 or may be input by a user of the device 16. In embodiments, the irrigation program information may be input by a user and may be sent to the controller element 10. In embodiments, the one or more memory elements 16b may be used to store location information related to each of the decoders 12 and included in or store along with the irrigation program information. In embodiments, the one or more memory elements 16b may be used to store unique identifier information provided based on the unique identifier 12a associated with each decoder 12 and include in or stored with the irrigation program information. In embodiments, the unique identifier information and location information may be linked or otherwise associated for each of the decoders 12. In embodiments, the unique identifier information may be extracted from or generated based on the unique identifier 12a. In embodiments, the unique identifier information and associated location information may be sent to the controller element 10 and stored with or otherwise associated with the irrigation program information. In embodiments, the unique identifier information and associated location information may be user to provide irrigation program information, for example, to designate an irrigation zone or line associated with the decoder based on its location. In embodiments, the unique identifier information and location information may be included with the irrigation program information to generate control signals that are addressed to the intended decoder 12 based on unique identifier and/or its location. In embodiments, the location information may be provided by a navigation device or application included in the mobile electronic device 16, such as a GPS device or software application. In embodiments, the GPS device may be a GPS transceiver. In embodiments, the location information may be provided based on input provided by the user. In embodiments, the location information may be based on the user's indication of the position of the decoder 12 on a map or graphical representation provided on the mobile electronic device 16. In embodiment, the map or graphical information may be provided based on data provided by the GPS device or may be generated based on map data provided from a third party. In embodiments, the map data may be stored in the memory 116ba and accessed to generate the map by the processor 116a based on the processor executable code.

In embodiments, the irrigation program information, including processor executable code, unique identifier information associated with the unique identifier 12a and associated location information may be stored in the memory 116a or one or more servers S operatively connected to or in communication with the portable electronic device 16. In embodiments, communication between the controller element 10 and the portable electronic device 16 may be provided via the one or more servers S. In embodiments, the controller element 10, or the processor 118 included therein, may access and receive the irrigation program information, including processor executable code, unique identifier information associated with the unique identifier 12a and associated location information from the server S. In embodiments, the one or more servers S may be associated with a cellular network provider or other communication network. In embodiments, the one more servers S may be operably connected to the Internet. In embodiments, the portable electronic device 16 may provide the irrigation program information, including processor executable code, unique identifier information associated with the unique identifier 12a and associated location information directly to the controller element 10 via wireless communication or wired communication is desired.

Figure 7B:
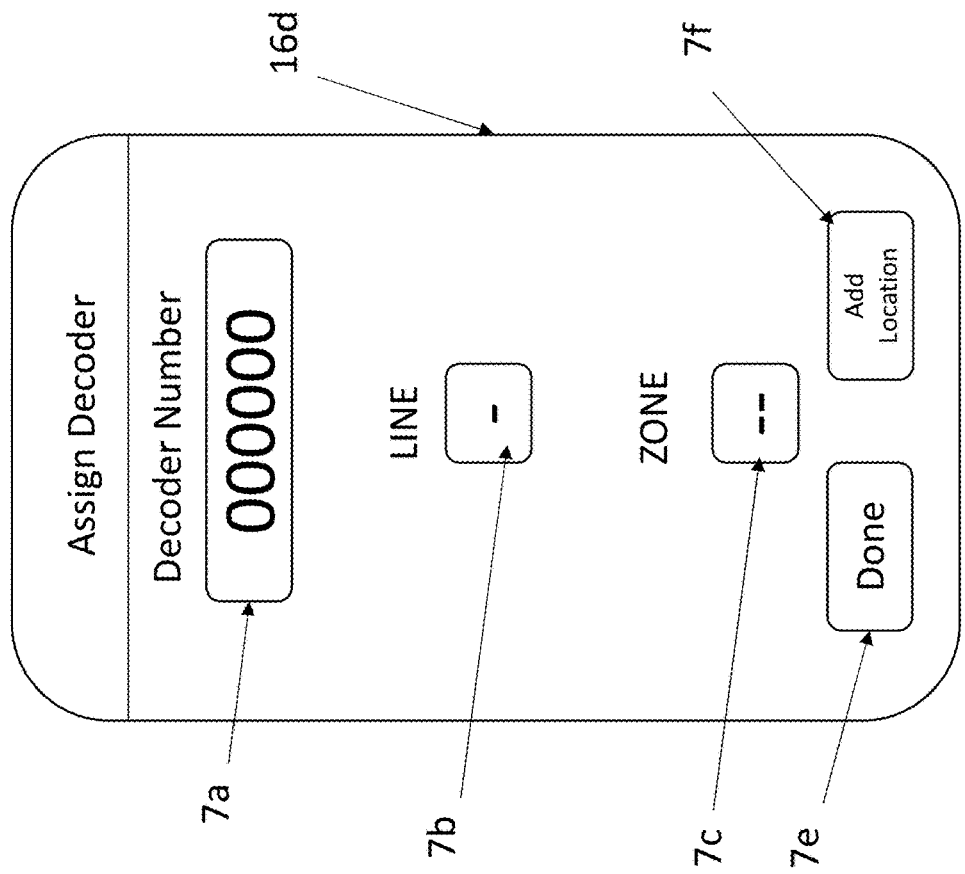
FIG. 7B illustrates an exemplary user interface shown on the display of the mobile device.
Figure 7A:
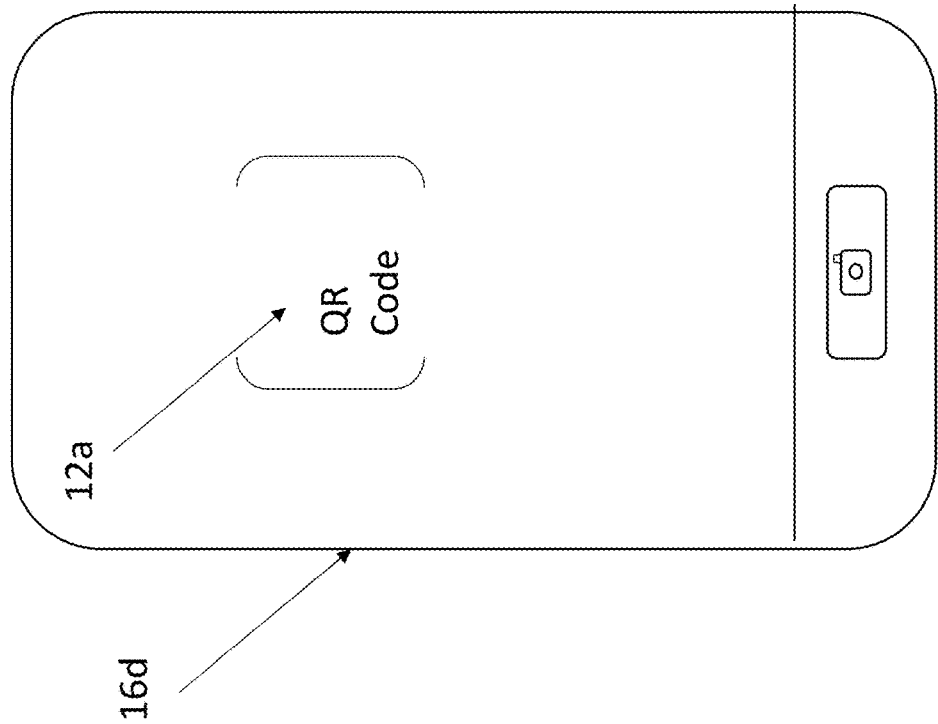
FIG. 7A illustrates as exemplary view of a display of a mobile device showing an exemplary unique identifier associated with a decoder device.
Figure 8:
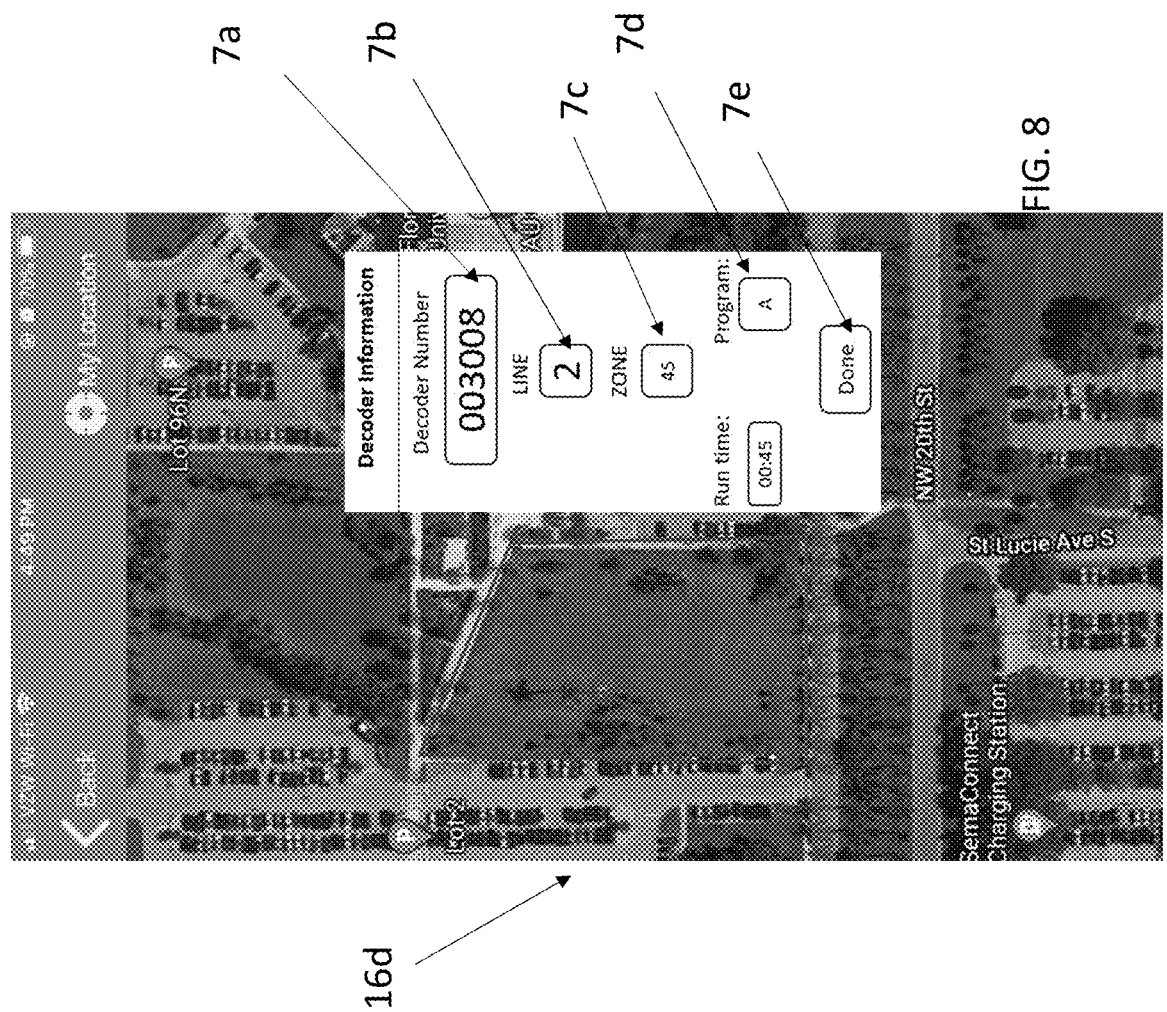
FIG. 8 illustrates the exemplary interface of FIG. 7B and an exemplary map that may be provided to identify a location of the decoder device.

In embodiments, the executable code provided in the memory 16b may be executed by the one or more processors 16a to provide a user interface on a display 16d of the mobile electronic device 16, which may include the map discussed above. FIG. 7A illustrates an exemplary unique identifier 12a in the form of a QR code illustrated on the display 16d. The image of the unique identifier 12a may be provided using a camera or other sensor 16c provided on the portable electronic device 16. In embodiments, the unique identifier information may be extracted or provided based on the image of the unique identifier 12a. As noted above, the unique identifier 12a may be non-visual such that another sensor 16c may be used to extract or provide unique identifier information associated with the unique identifier 12a. FIG. 7B illustrates an exemplary user interface that may be provided on the display 16d including a field 7a that may indicate unique identifier information in the form of an identification code associated with the unique identifier 12a and identifying a particular decoder 12. A line indicator button or selector 7b may be provided to indicate an irrigation line that is associated with decoder 12 (and its unique identifier 12a). In embodiments, selection of the line indicator button or selector 7b may trigger display of a menu that allows for selection of a specific line of the irrigation system to associate with the decoder 12 (and its unique identifier 12a or unique identification information) with the specific line. In embodiments, selection of the line indicator button may allow a user to enter the desired line number, or otherwise indicate it, via a keyboard or other input element. In embodiments, the selector 7b may be a field in which the line number may be entered. In embodiments, the line number may indicate a watering line to which the specific decoder is associated in the irrigation system. In embodiments, a zone indicator button or selector 7c may be provided to indicate an irrigation station or zone that the decoder 12 may be associated with. Selection of this button may initiate display of a menu allowing the user to select the desired irrigation zone to be associated with the module 12 (and its unique identifier or unique identification information). In embodiments, selection of the zone indicator button 7c may allow for a user to enter the station number or other irrigation zone or station identification information via a keyboard or other input device. In embodiments, information or selections may be made via verbal input using a microphone. In embodiments, irrigation program selection information may be provided via selector 7d which may allow for entry of multiple irrigation programs, for example Program A, Program B, etc. In embodiments, the display 16d may display the map discussed above (see FIG. 8, for example) that the user may use to indicate a location of the decoder 12 and other decoders by interaction with the map. In embodiments, the map may illustrate irrigation zones or stations and/or lines in the irrigation system and the location of the decoder 12 on the map may be used to select the line number and/or zone for the decoder. In embodiments, a done button or selector 7e may be provided for a user to indicate that they are done identifying and locating decoders. In embodiments, the user interface may include prompts for a user to provide irrigation program information to be used in the irrigation program to control operation of the irrigation system including watering on times, off times and watering days, for example, for each line, each irrigation zone, each valve, or each sprinkler which may include, or be included with the selections discussed above with respect to the identity and location of the decoders 12. In embodiments, the irrigation program information which may be entered via the interface of FIG. 7B may include or may include instructions to access the unique identifier information and associated location information as well as indications of which valves (for example V1, V2) the specific decoder 12 may be associated. In embodiments, the executable code may be provided as a software application implemented on the mobile electronic device 16. In embodiments, the mobile electronic device 16 may communicate with one or more remote servers S to communicate with the controller element 10. In embodiments, the mobile electronic device 16 may be a third party device onto which the mobile device module including the executable code is loaded or otherwise provided, for example, in the form of a mobile software application. In embodiments, the mobile electronic device 16 may communicate directly with the controller element 10.

In embodiments, the processor executable code on the mobile device 16 may include instructions to display on the display 16d of the mobile electronic device 16 the map or other graphical representation of the irrigation system which may indicate positions of decoders 12 in different irrigation zones. In embodiments, as noted above, the map of FIG. 8 may indicate locations of irrigation stations or zones or individual sprinklers therein and/or the decoders 12 associated with each. As noted above, the mobile electronic device 16 may include one or more sensors 16c that may be used to gather information for use in providing the irrigation program information. In embodiments, the one or more sensors 16c may include a camera. In embodiments, the camera 16c may be used to obtain an image of the unique identifier 12a included in each of the decoders 12 as noted above. As noted above, the unique identifier 12a may be a QR code. In embodiments, the image of the QR code provided by the camera 16c may be processed based on the executable instructions to extract or generate unique identifier information associated with the specific decoder 12. The unique identifier information may be provided by the camera or other sensor 16c integrated into or included in the mobile electronic device 16. In embodiments, as noted above, a navigation device or software application may be included in or integrated with the mobile electronic device 16 which may use GPS, WiFi or any other suitable technique to provide location information based on the identified decoder's current location. In embodiments, the mobile electronic device 16 may be in the same location as the decoder 12 when the location information is provided. In embodiments, the location information may be used to illustrate the position of each decoder 12 in the irrigation system on the map or graphical representation of the irrigation system. In embodiments, the map may be used to provide the location information for the specific decoder 12 based on a designation by the user on the map on the display 16*d*. As noted above, the location information may be used to designate or select a line, irrigation zone, vale or sprinkler to which the decoder is associated with. As noted above, this information may be stored in the memory 16*b* or at one or more servers S. In embodiments, the one or more sensors 16*c* may include or be operatively connected to a transceiver that may be used to receive and transmit data.

In embodiments, the unique identifier information associated with the respective decoder 12 and its location information or other association with a specific line, irrigation zone or valve may be provided to the controller element 10 along with or integrated into the irrigation program information. In embodiments, this information may be provided via a wireless communication system, such as a cellular system or other radio transmission to the transceiver 116 of the controller element 10. In embodiments, this information may be provided by a wired connection via port 114, for example. This information may be included in the irrigation program information provided to the controller element 10.

In embodiments, the controller element 10 may utilize the unique identifier information to address commands, or control signals, on the control line L to each respective decoder 12 based on the irrigation program information. In embodiments, the associated location information may also be used to address the control signals. In embodiments, the one or more processors 118 may provide the control signals intended for the specific decoder 12 in accordance with the unique identifier information and/or location information associated with the decoder 12 and the irrigation program information such that the instructions are implemented only by that decoder to activate the associate valve or valves at the desired on times and shut them off at the desired off times. Using the irrigation control system 1 of FIG. 1, programming of the controller element 10 with the irrigation program information may be performed remotely using the mobile electronic device 16. The mobile device 16 may be used to identify individual decoders 12 as noted above, based on the unique identifier 12*a* such that instructions can be properly provided on the control line L. Alternatively, irrigation program information may be provided directly via the controller element 10 and combined with unique identifier information and/or location information.

Figure 6:
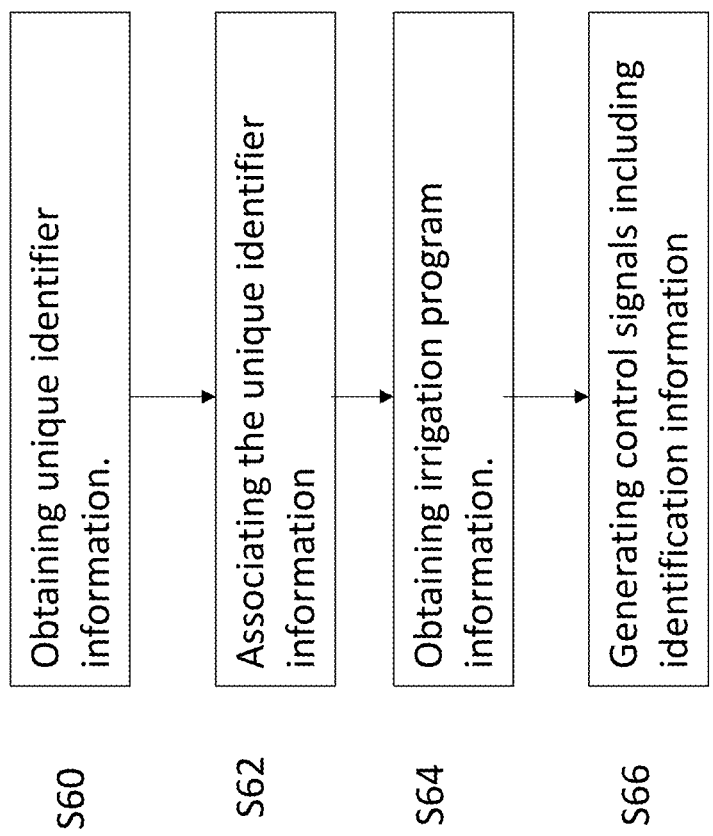
FIG. 6 illustrates an exemplary flow chart illustrating the steps of controlling an irrigation system suitable for use by the irrigation control system of FIG. 1.

FIG. 6 illustrates an exemplary flow chart indicating the steps that may be implemented by the system 1 to control the irrigation system. In embodiments, at step S60, the unique identifier information associated with a decoder 12 may be obtained. In embodiments, the unique identifier information associated with each decoder 12 may be based on or associated with the unique identifier 12*a*. In embodiments, the obtaining step S60 may include scanning the unique identifier 12*a* using a camera or video scanning element. In embodiments, the unique identifier information may be provided using a sensor 16*c*, for example. As noted above, the unique identifier 12*a* may be a QR code, barcode or other indicator associated with the specific decoder 12. In embodiments, the unique identifier 12*a* may be or include a serial number or other unique indicia associated with the specific decoder 12. In embodiments, as noted above, step S60 may include receiving a wireless transmission of a unique identifier 12*a* in which case a video scanning element may not be used. In embodiments, the camera, video scanning element or sensor 16*c* may be included in a mobile electronic device 16, for example.

In embodiments, at step S62, the unique identifier information may be associated with a particular valve or irrigation zone, which may include multiple sprinklers and multiple valves. In embodiments, the unique identifier information may be associated with at least one valve, for example V1 or V2. In embodiments, this association may take place in the mobile electronic device 16 or module using the interface of FIG. 7B, for example. In embodiments, the association may take place at the controller element 10, using the processor 118. In embodiments, additional program information may be provided at the controller element via the input elements 112*a* or may be accessed or retrieved from the memory 118*a*. In embodiments, this associating step may take place at or using the one or more servers S. In embodiments, this associating step may be based on or include location information associated with the decoder 12. In embodiments, the location information may be input by a user or obtained from a navigation program or device such as a GPS device, for example, as discussed above. In embodiments, the association may be based on input from a user indicating that a specific decoder 12, associated with a unique identifier 12*a*, should be associated with a specific irrigation zone or sprinkler or location. In embodiments, the association may be illustrated on a map or other graphical representation on a display 16*d* of the mobile device 16, for example. In embodiments, the display 16*d* may be a touch screen and the user may interact directly with the map or graphical display to indicate the desired association as well as the location information to be used therein. In embodiments, as noted above, the location information may be used to associated the decoder with a specific line, irrigation zone, valve or sprinkler. In embodiments, the user may provide input via the touch screen display to provide the association in step S62.

In embodiments, at step S64, irrigation program information may be obtained. In embodiments, the user may input irrigation program information such as watering on times, watering off times and watering days, for example. In embodiments, the irrigation program information may indicate lines, irrigation stations and/or valves associated with the watering on times, watering off times and watering days. In embodiments, the irrigation program information may be provided via one or more input elements of the mobile electronic device 16 or module. In embodiments, the irrigation program information may be provided via the controller element 10 and/or via the mobile electronic device 16. In embodiments, the irrigation program information may be combined with the unique identifier information and associated location information for the decoder 12, or all decoders 12 to specify specific decoders. The irrigation program information may include line information, irrigation station or zone information and/or valve information associated with each of the decoders 12 as noted above. In embodiments, the irrigation program information may be retrieved from one or more memory elements 118*a* provided at the controller element 10 or from the server S.

In embodiments, in step S66, controller element 10 generates the control signals based on the irrigation program information. In embodiments, the irrigation program information obtained in step S64 may be stored in the memory 118*a* and accessed by the processor 118. In embodiments, the information may be accessed from or via the one or more servers S. In embodiments, the one or more servers S may be associated with a cellular network or another wireless or wired communications network. In embodiments, where the information is input via the controller element 10, the information may be accessed by the processor 118 of the controller element 10 from the memory element 118*b*, for example. In embodiments, the information may be provided to the server S and may be accessed by the controller element 10. In embodiments, the step S66 may include accessing the unique identifier information and/or associated location information. In embodiments, the irrigation program information may be accessed by the processor 118 from the memory 118*b* in the controller element 10.

The controller element 10 generates appropriate control signals for the decoder 12 to actuate the valves V1, V2, for example, in accordance with the irrigation program information including the identification information in step S66. In embodiments, the location information and unique identifier information may be stored as part of the irrigation program information in the memory 118*b*, for example, and accessed by the processor 118 to provide the control signals. In embodiments, this information may be used to generate or otherwise provide a line selection, zone selection and/or valve or sprinkler selection associated with each decoder as identified by the unique identifier information for that decoder and the control signals may be addressed based on the unique identifier information for each decoder. Where the irrigation program information is provided via the control element 10, it may simply be accessed by the processor 118. In embodiments, the control signals may include identification information associated with the respective decoder 12 or decoders based on the unique identifier information and/or associated location information. The control signals may be provided to the decoders 12 via the control line L. Since each individual decoder 12 is associated with unique identifier information associated with the unique identifier 12*a*, the identification information may be utilized to address the control signals to desired decoders, which may be identified based on location information. In embodiments, the identification information may be used to modulate the control signals uniquely for each decoder 12 to ensure that the instructions are executed by the correct decoder 12.

In embodiments, the system 1 may include multiple decoders 12 as well as multiple valves and is not limited to the decoders and valves illustrated herein.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. An irrigation control system comprising:
  a controller configured to provide control signals to an irrigation system based on irrigation program information;
  a decoder configured to control one or more valves of the irrigation system, the decoder including a unique identifier associated with the decoder;
  a control line connecting the controller to the decoder and operable to provide the control signals to the decoder, wherein the control signals include identification information associated with the decoder;
  wherein the decoder operates the one or more valves based on the control signals when the identification information corresponds to the unique identifier associated with the decoder;
  a sensor configured to obtain unique identifier information associated with the decoder based on the unique identifier,
  wherein the unique identifier information is provided to the controller and the controller provides the control signals based on the unique identifier information; and
  a navigation element configured to provide location information associated with the decoder, wherein the location information is associated with the unique identifier information of the decoder.

2. The irrigation control system of claim 1 wherein the navigation element includes any position determining component.

3. The irrigation control system of claim 1, wherein the decoder is connected to at least a first valve and the decoder provides control signals to open and close at least the first valve.

4. The irrigation control system of claim 1, further comprising:
  a second decoder configured to control at least a second valve, wherein the second valve is connected to the second decoder, wherein the second decoder includes a second unique identifier;
  the control line connecting the controller to the second decoder and operable to provide the control signals to the second decoder based on the second unique identifier information.

5. The irrigation control system of claim 4, wherein a navigation device is configured to obtain second location information associated with the second decoder.

6. The irrigation control system of claim 5, wherein second unique identifier information is associated with the second location information.

7. The irrigation control system of claim 6, wherein the map indicates the second decoder and a respective position thereof in the irrigation system.

8. The irrigation control system of claim 7, wherein the second location information is provided via interaction with the map.

9. An irrigation control system comprising:
  a controller configured to provide control signals to an irrigation system based on irrigation program information;
  a decoder configured to control one or more valves of the irrigation system, the decoder including a unique identifier associated with the decoder;
  a control line connecting the controller to the decoder and operable to provide the control signals to the decoder, wherein the control signals include identification information associated with the decoder;
  wherein the decoder operates the one or more valves based on the control signals when the identification information corresponds to the unique identifier associated with the decoder;
  a sensor configured to obtain unique identifier information associated with the decoder based on the unique identifier,
  wherein the unique identifier information is provided to the controller and the controller provides the control signals based on the unique identifier information;
  a navigation element configured to provide location information associated with the decoder, wherein the location information is associated with the unique identifier information of the decoder; and a mobile electronic device, wherein the sensor and navigation element are provided in the mobile electronic device.

10. The irrigation control system of claim 9, wherein the mobile electronic device provides the unique identifier information and associated location information to the controller.

11. The irrigation control system of claim 9, wherein the mobile electronic device generates a map indicating the decoder and the location information is provided based on interaction with the map.

12. The irrigation control system of claim 11, wherein the mobile electronic device comprises a display and is configured to present the map on the display.

13. The irrigation control system of claim 11, wherein the mobile electronic device includes one or more input elements and the location information is provided via the input elements.

14. The irrigation control system of claim 11, wherein the mobile electronic device includes a GPS device and the location information is provided by the GPS device.

* * * * *